(12) United States Patent
Osuka et al.

(10) Patent No.: US 6,426,032 B1
(45) Date of Patent: Jul. 30, 2002

(54) METHOD OF INJECTION-MOLDING COIL SPOOL OF IGNITION COIL DEVICE

(75) Inventors: Kazutoyo Osuka, Gamagori; Norihiro Adachi, Kariya, both of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/469,293

(22) Filed: Dec. 22, 1999

(30) Foreign Application Priority Data

Dec. 24, 1998 (JP) .......................................... 10-365962

(51) Int. Cl.[7] .......................... B29C 45/03; B29C 45/26
(52) U.S. Cl. ..................... 264/328.9; 264/328.12; 264/272.19
(58) Field of Search ................... 264/272.19, 272.2, 264/328.1, 328.9, 328.12; 29/605, 606; 425/129.1; 336/198, 185, 208

(56) References Cited

U.S. PATENT DOCUMENTS

| | | | | |
|---|---|---|---|---|
| 3,084,390 A | * | 4/1963 | Anderson | 264/272.19 |
| 3,768,152 A | * | 10/1973 | Swanke et al. | 29/605 |
| 4,926,152 A | * | 5/1990 | Ito et al. | 336/90 |
| 5,420,559 A | | 5/1995 | Ohshiba et al. | |
| 5,596,797 A | * | 1/1997 | Bumsted | 29/601 |
| 5,720,264 A | * | 2/1998 | Oosuka et al. | 123/634 |
| 5,778,863 A | * | 7/1998 | Oosuka et al. | 123/634 |
| 5,887,337 A | * | 3/1999 | Prochaska | 29/605 |
| 5,929,736 A | * | 7/1999 | Sakamaki et al. | 336/96 |
| 5,963,118 A | * | 10/1999 | Kawano et al. | 336/198 |
| 6,119,667 A | * | 9/2000 | Boyer et al. | 123/634 |
| 6,191,674 B1 | * | 2/2001 | Adachi et al. | 336/90 |
| 6,208,231 B1 | * | 3/2001 | Oosuka et al. | 336/107 |
| 6,216,679 B1 | * | 4/2001 | Skinner et al. | 123/635 |
| 6,232,863 B1 | * | 5/2001 | Skinner et al. | 336/96 |
| 6,235,230 B1 | | 5/2001 | Puniello | |
| 6,252,482 B1 | * | 6/2001 | Chiba et al. | 336/96 |
| 6,276,348 B1 | * | 8/2001 | Skinner et al. | 123/634 |

* cited by examiner

*Primary Examiner*—Angela Ortiz
(74) *Attorney, Agent, or Firm*—Nixon & Vanderhye PC

(57) ABSTRACT

A gate to mold a primary spool of an ignition coil device is placed at a part which does not oppose a main part of a secondary coil in the primary spool, that is, at a part other than a coil winding portion. It is preferred to use a resin having a high dielectric withstanding voltage and a high flowability, such as polybutylene terephthalate (PBT) or polyethylene terephthalate (PET), polyphenylene oxide (PPO)/polystyrene (PS), or liquid crystal polymer. By arranging the gate except at the winding portion, resin deterioration or cracks occur only at a part which does not oppose the secondary coil, that is, at a part where a high voltage from the secondary coil is relatively low. An adequate dielectric withstanding voltage is ensured without winding an insulation tape around the winding portion.

19 Claims, 2 Drawing Sheets

METHOD OF INJECTION-MOLDING COIL SPOOL OF IGNITION COIL DEVICE

CROSS REFERENCE TO RELATED APPLICATION

This application relates to and incorporates herein by reference Japanese Patent Application No. 10-365962 filed on Dec. 24, 1998.

BACKGROUND OF THE INVENTION

1. Field of the Invention

The present invention relates to a method of injection-molding coil spools for ignition coil devices, and particularly to a method of injection-molding a spool of a primary coil of a stick-type ignition coil device.

2. Related Art

Generally, a stick-type ignition coil device for engines includes a column-shaped central core, a primary spool disposed coaxially with the core, a primary coil wound around the primary spool, a secondary spool disposed coaxially with the core and disposed radially inside the primary spool, and a secondary coil wound around the secondary spool.

Since the stick-type ignition coil device is installed in a plug hole of each cylinder of an internal combustion engine, an outer diameter of the stick-type ignition coil device should not be greater than an inner diameter of the plug hole. Therefore, the spools are preferably thinned and elongated in order to ensure winding space of the coils.

The spools are formed by injection-molding a resin. However, this necessitates an insulation tape around the thinned winding portion of the primary spool in order to ensure the dielectric withstanding voltage, because the primary spool is located between the primary coil and the secondary coil.

SUMMARY OF THE INVENTION

The present invention has an object to provide a method of injection-molding a coil spool of an ignition coil device, which can ensure an adequate dielectric withstanding voltage without requiring an insulation tape around the coil spool thereby to reduce production costs.

According to the present invention, a coil spool of an ignition coil device is formed by molding a resin in a cavity of a molding die. A gate of the molding die is arranged at a part where a portion other than a coil winding portion is to be formed. An insulating resin is injected through the gate to form the coil spool. The coil spool and the coil are for a primary unit of the ignition coil device, and disposed radially outside of a secondary unit of the ignition coil device.

Preferably, the gate is a side-type and arranged at a part where each flange is to be formed on the coil spool. Alternatively or in combination, the gate is arranged to open in a circumferential direction in a ring shape at a part where a cylindrical part of the coil spool which is outside the flanges in an axial direction is to be formed. Further, alternatively or in combination, the gate is arranged at an axial end of the coil spool and extends in an axial direction.

DETAILED DESCRIPTION OF THE PREFERRED EMBODIMENT

An embodiment of the present invention will be described hereinbelow with references to the drawings.

Figure 1:
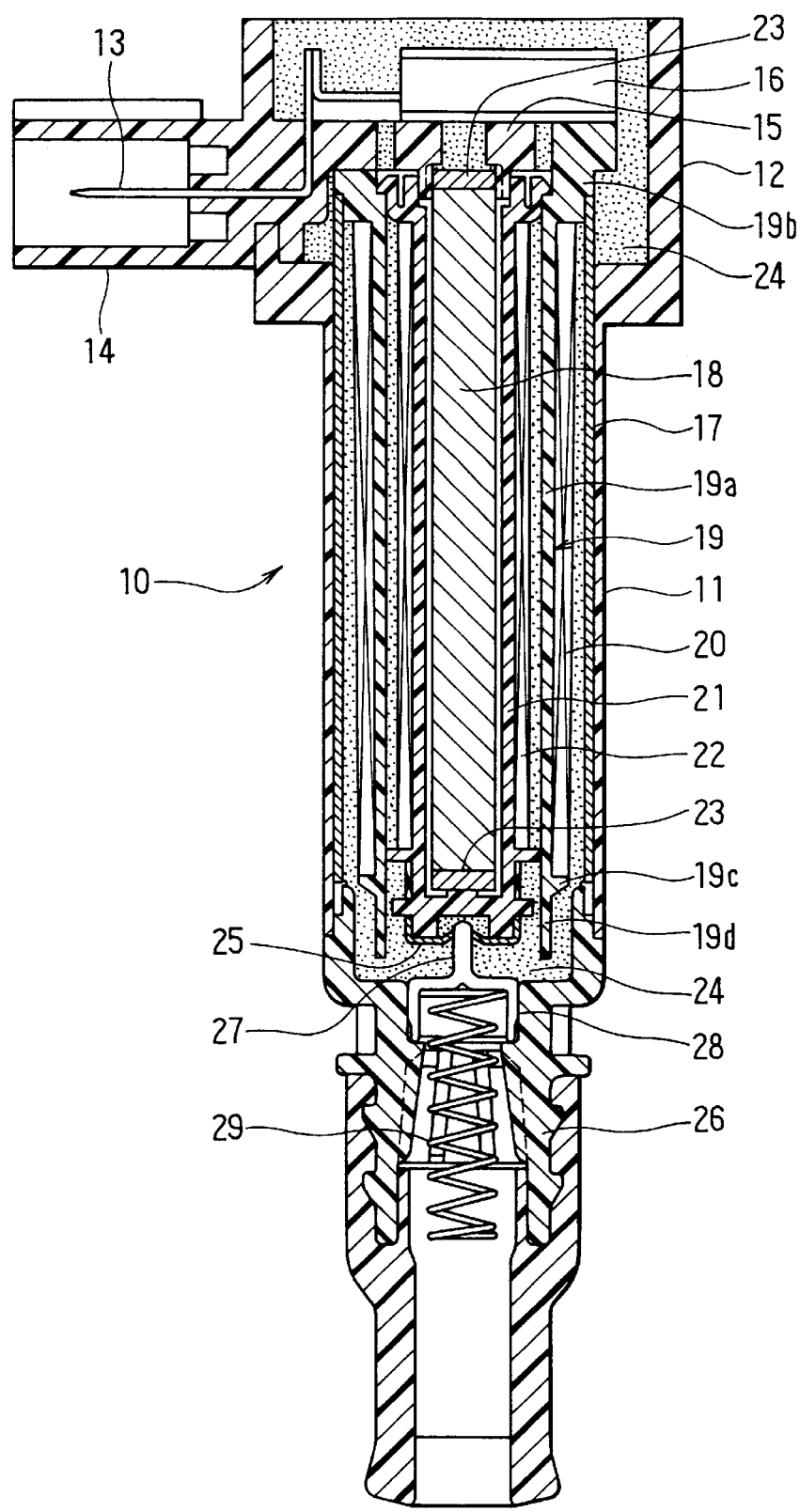
FIG. 1 is a sectional view showing an ignition coil device to which the present invention is applied.

Referring first to FIG. 1, an ignition coil device 10 has a cylindrical coil casing 11 which is made of an insulating resin and has an upper casing 12 on its top. A connector housing 14 is fit into the upper casing 12 and a terminal pin 13 is press-fit into the connector housing 14. An igniter 16 is mounted on bases 15 integrally formed in the connector housing 14. An ignition signal outputted from an engine control computer (not shown) is inputted to the igniter 16 through the terminal pin 13 to control energization and deenergization of a primary coil 20.

A cylindrical central core 18 is disposed in a radial center of the coil casing 11, and a cylindrical outer core 17 is coaxially disposed in an inner peripheral side of the coil casing 11. The primary coil 20 is wound around a cylindrical primary spool 19 made of an insulating resin, and is disposed in an inner peripheral side of the cylindrical outer core 17. Further, a secondary coil 22 is wound around a cylindrical secondary spool 21 made of an insulating resin, and is disposed in an inner peripheral side of the primary spool 19. The secondary coil 22 is wound to extend generally the same length in the axial direction as that of the primary coil 20. That is, both coils 20 and 22 are positioned at generally the same position in the axial direction. A conductive terminal plate 25 is fixed to a bottom of the secondary spool 21 and connected with an end of the secondary coil 22.

Further, the central core 18 is disposed in an inner peripheral side of the secondary spool 21 which is in a bottomed cylinder-shape. At the top side and the bottom side of the central core 18, cushions 23 are positioned to protect the central core 18 from excessive stress. The cushions 23 are made of heat resisting elastic material such as anti-magnetostrictive sponge or elastomer. Moreover, the coil casing 11 and upper casing 12 are vacuously filled with an insulating potting resin such as an epoxy thermosetting resin.

A high voltage tower 26 is attached in contact with the bottom of the coil casing 11. A terminal cup 28 which is integral with a high voltage terminal 27 is inserted or press-fit into a central top of the high voltage tower 26. The high voltage terminal 27 is press-fit into the terminal plate 25 and electrically connected. By inserting the high voltage tower 26 into a plug hole (not shown) and pressing into the top of a spark plug (not shown), a conductive spring 29 accommodated within the terminal cup 28 is pressed against the terminal of the spark plug. Thus, an end of the secondary coil 22 is electrically connected to the terminal of the spark plug through the terminal plate 25, high voltage terminal 27, terminal cup 28 and spring 29.

Since the stick-type ignition coil device 10 is mounted in the plug hole, the outer diameter of the coil casing 11 is not greater than the inner diameter of the plug hole. Thus, in order to ensure a winding space for the primary coil 20, for example, the primary spool 19 preferably has a thickness between 0.4 millimeter and 1.0 millimeter, and a length between 50.0 millimeters and 150.0 millimeters.

Figure 2:
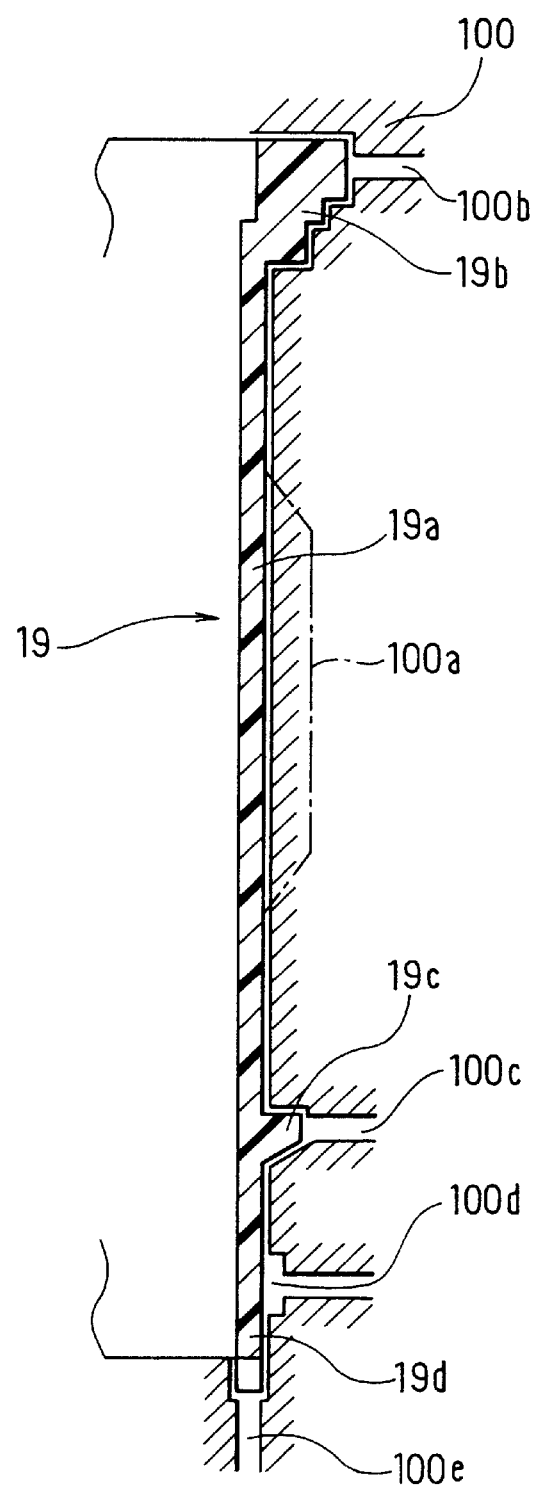
FIG. 2 is a sectional view showing gates of a molding die to mold a primary spool according to an embodiment of the present invention.

The primary spool 19 is formed with an upper flange 19b and a lower flange 19c to define a winding portion 19a therebetween so that the primary coil 20 is wound between the flanges 19b and 19c to face the secondary coil 22 in the radial direction. The primary spool 19 is made by using a molding die 100 shown in FIG. 2, in which only an outer die is shown.

The flowability of a molten resin decreases in accordance with the passage area in the molding die 100, that is, in accordance with the thinness and elongation of the primary spool 19. If an axially-extending side gate 100a is formed in the molding die 100, at a part where the winding portion 19a of the primary spool 19 is made and the primary spool 19 is made by injecting the molten resin from the long side gate 100a into a cavity in the molding die, the resin deterioration (molecular orientation) occurs around the long side gate due to shearing force of the molten resin. Further, the small cracks occur in the winding portion 19a, when the molding-resulting part corresponding to the long side gate 100a is cut off after the injection molding. As a result, the dielectric withstanding voltage of the winding portion 19a is reduced. Thus, it is necessary to wind an insulation tape around the winding portion 19a in order to ensure the dielectric withstanding voltage against the high voltage generated from the secondary coil 22.

According to this embodiment, a molding gate 100b, 100c, 100d or 100e of the molding die 100 to mold the primary spool 19 is positioned at a part where the winding portion 19a is not formed. That is, the gate is positioned to face a part of the primary spool 19 which does not face a main part of the secondary coil 22 when the resin is injection-molded. Specifically, the gate is positioned to be outside the winding portion 19a in the axial direction.

For instance, the gate 100b is arranged at a position to form the upper flange 19b of the primary spool 19 and opens in the radial direction. The gate 100c is arranged at a position to form a lower flange 19c and opens in the radial direction. The gate 100d is arranged at a position to form an outer peripheral face of a cylindrical portion 19d which extends downwardly from the winding portion 19a. The gate 100d opens in the circumferential direction to surround the cylindrical portion 19d. The gate 100e is arranged at a position to form the bottom face of the cylindrical portion 19d and opens in the axial direction.

Since there is the irregularity on the outer peripheral faces of the upper flange 19b and the lower flange 19c, the gates 100b and 100c are in a side-type which does not open over an entire circumference. In the case of the side-type gate, considering the flowability of resin, it is preferred to use a plurality of side gates 100b, 100c so that the flowability of the molten resin can be uniformed.

On the other hand, since an outer peripheral face of the cylindrical portion 19d is in a cylindrical shape, it is preferred that the gate 100d is in a ring-type which opens over an entire circumference. Moreover, since the bottom face of the cylindrical portion 19d is in a ring shape, it is also preferred to use the ring-type for the gate 100e. From the ring gates 100d and 100e, a molten resin can equally fill the cavity in the molding die 100 to form the thin winding portion 19a of the primary spool 19, and a moldability is improved than in the case of a side gate. However, it is also possible to arrange a plurality of side gates at the outer peripheral face and the bottom face of the cylindrical portion 19d.

In order to form the thin and elongated primary spool 19 by arranging the gates except around the winding portion 19a, it is necessary to use an insulating resin having a high flowability. Here, such a resin is, for example, ① polybutylene terephthalate (PBT) or polyethylene terephthalate (PET), ② polyphenylene oxide (PPO)/polystylene (PS), ③ liquid crystal polymer and the like. These resins are suitable for the primary spool 19 because of high dielectric withstanding voltage, flowability and adhesiveness with the epoxy type filler 24.

Moreover, by arranging the gate on the primary spool 19 except on the winding portion 19a, resin deterioration and cracks occur only on a part which dose not oppose the main part of the secondary coil 22, that is, where a voltage applied from the secondary coil 22 is relatively low. Therefore, the adequate dielectric withstanding voltage can be ensured without using an insulation tape, and the process of winding insulation tape becomes unnecessary. Consequently, the productivity is improved in accordance with the reduction in the number of processes.

In this case, the high voltage generated by the secondary coil 22 becomes lower towards the upper side and higher towards the bottom side in the axial direction. Therefore, if the gate 100b is arranged to correspond to the upper flange 19b where the applied voltage is the lowest in the primary spool 19, disadvantage due to resin deterioration or cracks around the gate becomes the least.

Further, if the ring gate 100d is arranged to correspond to the cylindrical portion 19d the outer peripheral face of which is cylindrical, the molten resin can be equally filled into all around the thin winding portion 19a of the primary spool 19 so that the moldability is improved.

The gate is not limited to the side-type or ring-type, but it may be a pin gate or the like. Further, the secondary spool may also be formed by the same method of injection molding.

What is claimed is:

1. A method of molding a primary spool of a stick ignition coil device, for installation in a plug hole, and which has a secondary coil and a secondary spool disposed coaxially inside the primary spool, the method comprising the steps of:
    positioning a ring-shaped gate of a molding die at a part except at a part where a coil winding part of the primary spool which supports a primary coil thereon and faces the secondary coil is to be formed, the ring-shaped gate being circumferentially open; and
    injecting an insulating resin through the ring-shaped gate to form the primary spool.

2. The method of claim 1, wherein the ring-shaped gate is arranged at a part where a cylindrical part of the primary spool is to be formed, so that the insulating resin is injected transversely to the cylindrical part to be formed.

3. The method of claim 1, wherein the ring-shaped gate is arranged at a part where an axial end of a cylindrical part of the primary spool is to be formed, so that the insulating resin is injected in an axial direction of the cylindrical part to be formed.

4. The method of claim 1, wherein the ring-shaped gate is arranged at a part where a peripheral side of the primary spool is to be formed, and the peripheral side is adjacent to one end of the secondary coil, said one end of the secondary coil being the end of the secondary coil where a secondary voltage is lower than at another end of the secondary coil.

5. The method of claim 1, wherein the primary spool has a pair of flanges between which the coil winding part is to be formed and the primary coil is wound, and an additional gate is arranged at a part where at least one of the flanges is to be formed.

6. The method of claim 5, wherein the additional gate is positioned in correspondence with each said flange and extends in a generally radial direction, so that the insulating resin is injected in the radial direction.

7. The method of claim 1, wherein the ring-shaped gate is arranged at an axial end of the primary spool and extends in an axial direction, so that the insulating resin is injected in the axial direction.

8. The method of claim 1, wherein the ring-shaped gate is arranged at a part where a cylindrical portion of the primary spool outside of the flange is to be formed.

9. The method of claim 8, wherein the part is close to an end of the secondary coil where a high voltage of the secondary coil is higher than at another end of the secondary coil.

10. A method of molding a primary coil spool of a plug hole-installed stick ignition coil device for engines, the primary coil spool to be formed being cylindrically shaped and having a pair of flanges to define a main part therebetween to support a primary coil therearound in a facing relation to a secondary coil, the method comprising:

arranging a ring-shaped gate of a molding die at a part where a portion of the primary coil spool other than where said main part is to be formed, the ring-shaped gate being circumferentially open; and injecting an insulating resin through the ring-shaped gate to form the primary coil spool.

11. The method of claim 10, wherein an additional gate is arranged at a part where each said flange is to be formed.

12. The method of claim 11, wherein the additional gate is arranged at a side which is remote in an axial direction from an end of the secondary coil that is connectable to a spark plug.

13. The method of claim 11, wherein the additional gate is arranged at a side which is close in an axial direction to an end of the secondary coil that is connectable to a spark plug.

14. The method of claim 10, wherein the ring-shaped gate is arranged to open in a circumferential direction at a part where a cylindrical part of the primary coil spool which is outside the flanges in an axial direction is to be formed.

15. The method of claim 10, wherein the ring-shaped gate is arranged at an axial end of the primary coil spool and extends in an axial direction.

16. The method of claim 10, wherein the primary coil spool and the primary coil are for a primary unit of the coil device, and disposed radially outside of a secondary unit of the coil device having the secondary coil which is connectable to a spark plug.

17. A method of molding a primary spool of a stick ignition coil device to be installed in a plug hole of an engine, with a secondary coil and a secondary spool disposed coaxially inside the primary spool, the method comprising the steps of:

positioning a ring-shaped gate of a molding die axially outside a winding area where a winding portion of the primary spool, which supports a primary coil thereon and faces the secondary coil, is to be formed, the ring-shaped gate being circumferentially opened; and injecting an insulating resin through the ring-shaped gate to form the primary spool.

18. A method as in claim 17, wherein said step of injecting an insulating resin comprises injecting an insulating resin having a high flowability selected from the group consisting of polybutylene terephthalate (PBT), polyethylene terephthalate (PET), polyphenylene oxide (PPO)/polystyrene (PS), and liquid crystal polymer.

19. The method of claim 17, wherein the primary spool to be formed has a pair of flanges between which the winding portion is formed and an additional gate is arranged at a part where at least one of the flanges is to be formed.

* * * * *